(12) United States Patent
Miette et al.

(10) Patent No.: US 8,630,451 B2
(45) Date of Patent: Jan. 14, 2014

(54) METHOD OF PROCESSING IMAGES, WITH THE RESULTS OF THE PROCESSING BEING OVERLAID IN THE IMAGES

(75) Inventors: Emmanuel Miette, Saint Gratien (FR); Christophe Caillon, Bretigny sur Orge (FR)

(73) Assignee: Solystic, Gentilly Cedex (FR)

( * ) Notice: Subject to any disclaimer, the term of this patent is extended or adjusted under 35 U.S.C. 154(b) by 111 days.

(21) Appl. No.: 13/179,112

(22) Filed: Jul. 8, 2011

(65) Prior Publication Data

US 2012/0008824 A1  Jan. 12, 2012

(30) Foreign Application Priority Data

Jul. 9, 2010 (FR) ..................... 10 55637

(51) Int. Cl.
*G06K 9/00* (2006.01)
(52) U.S. Cl.
USPC ......................................................... 382/101
(58) Field of Classification Search
None
See application file for complete search history.

(56) References Cited

U.S. PATENT DOCUMENTS

| 2004/0005080 | A1* | 1/2004 | Hayduchok | 382/101 |
| 2005/0004882 | A1  | 1/2005 | Teichgraber et al. | |
| 2005/0269395 | A1* | 12/2005 | Miette et al. | 235/375 |
| 2009/0108071 | A1* | 4/2009 | Carlson | 235/462.32 |

FOREIGN PATENT DOCUMENTS

| EP | 1129792 A1 | 9/2001 |
| EP | 1607143 A1 | 12/2005 |
| EP | 1840799 A1 | 10/2007 |

OTHER PUBLICATIONS

Kubota, K., et al., "Technology Trend of Postal Automation", NEC Research and Development, Nippon Electric Ltd., Tokyo, Japan, vol. 40, No. 2, Apr. 1, 1999, pp. 127-136, XP008085752.

* cited by examiner

*Primary Examiner* — Stephen R Koziol
*Assistant Examiner* — Delomia Gilliard
(74) *Attorney, Agent, or Firm* — Rothwell, Figg, Ernst & Manbeck, P.C.

(57) ABSTRACT

A method of processing digital images, in which method a digital image is taken of a mailpiece, which image includes certain information, and certain OCR processing is applied to said image for the purpose of recognizing said information using OCR, the method is characterized in that it further includes a step of applying other OCR processing to said image for the purpose of recognizing said information, and a step of overlaying in said image results of said other OCR processing in a form recognizable by said certain OCR processing. This method makes it possible to obtain reinforced processing capacities by enriching the capacities of the first processing with the capacities of the other processing without calling into question the logical and physical interfaces of the first processing.

9 Claims, 2 Drawing Sheets

METHOD OF PROCESSING IMAGES, WITH THE RESULTS OF THE PROCESSING BEING OVERLAID IN THE IMAGES

BACKGROUND OF THE INVENTION

The invention relates generally to processing digital images for recognizing information by using Optical Character Recognition (OCR). The invention applies more particularly to processing digital images of mailpieces for automatically recognizing postal addresses by using OCR, with a view to automatically sorting such mailpieces in postal sorting installations.

The terms "mail" and "mailpieces" are to be understood generally as being letters, large-format flat articles or "flats" such as magazines, and also packets, parcels, or the like that can be processed by postal operators.

The invention thus relates more particularly to a method of processing digital images, in which method a digital image is taken of a mailpiece bearing certain information and OCR is applied to the information in said image by using an OCR reader. Patent Document EP 1 129 792 discloses a method of processing images of mailpieces. In that method, on the basis of an image of a mailpiece, an address in the image is recognized by using OCR, and that address is printed on the mailpiece in the form of a bar code encoding the delivery postal address of the mailpiece. In the article entitled "Technology Trend of Postal Automation" dating from 1999, various types of OCR are presented for reading postal addresses on mailpieces. Patent Document EP 1 840 799 describes a method of reading postal addresses on mailpieces. In that method, OCR is used that is specialized as a function of the results of dual binarization of the image of each mailpiece.

Incorporating additional capacities for recognizing postal addresses on mailpieces in an existing postal sorting machine is always very complex and costly because it can call into question the computer architectures in the installation, and the communications protocols for communication between the various pieces of equipment in the installation. Such incorporation can even make it necessary to change the format of the data transmitted between the pieces of equipment, and also to change the software applications in order to take account of the new information exchanged between the pieces of equipment. Very often, all these constraints lead users of such installations to leave them as they are rather than to upgrade them to benefit from the latest technological developments.

SUMMARY OF THE INVENTION

An object of the invention is to remedy that drawback by proposing a simple solution making it possible to incorporate technological developments relating to OCR processing of information in an existing automatic postal sorting installation without calling into question the logical and physical communications interfaces in the installation.

To this end, the invention provides a method of recognizing certain information on a mailpiece, in which method a digital image is taken of the mailpiece, which image includes said information to be recognized, and first recognition processing is applied to said image for the purpose of recognizing said information using primary OCR, said method being characterized in that it further includes the following steps:

applying other recognition processing to said image, upstream from the first recognition processing, for the purpose of recognizing the information using secondary OCR that is improved relative to said primary OCR so as to obtain additional results for recognizing said information;

encoding said additional results and overlaying in said image said results as encoded in a form recognizable by said first recognition processing; and having said first recognition processing extract and use the results encoded in the image for the purpose of recognizing said information.

Consequently, the basic idea of the invention is thus to use the digital image itself to convey to primary image processing (existing OCR processing) the results produced by secondary image processing (additional OCR processing) implemented upstream from said primary processing so as to take advantage of the latest technological developments. Most existing systems for recognizing postal addresses in the digital images of mailpieces are designed for recognizing and decoding bar codes encoding a wide variety of information such as a postcode or "Zip" code, the details of the delivery address block in the image, identifiers of senders or of recipients of mail, etc.

The solution of the invention thus consists in encoding and in overlaying the results of the secondary OCR processing in the image such that said results are recognizable by the primary OCR processing. If, for example, the secondary processing makes it possible to recognize unambiguously in an image of a mailpiece a postcode in the recipient address block, the primary processing can immediately retrieve said recognition result and sorting of the mailpiece can continue automatically by means of the contribution made by the secondary processing. If the result produced by the secondary OCR processing is partial and is limited, for example to identification of the recipient address block in the digital image, that information makes it possible to enrich the primary recognition processing, so that said primary processing can recognize the full address of the recipient more easily and therefore automatically, where such full recognition is not necessarily possible with the primary OCR processing. Naturally, in the context of the invention, the primary OCR processing and the secondary OCR processing are generally different from each other in that the secondary processing presents improvements relative to the primary processing.

The method of the invention may have the following features:

said results are overlaid in the form of a bar code recognizable by said first processing;

said information is a delivery postal address of the mailpiece and wherein said bar code is overlaid in the image in the vicinity of the address block;

said bar code is overlaid in the digital image under the address block;

said bar code is overlaid in the image within a rectangular white background.

The invention also provides apparatus for recognizing certain information on a mailpiece, which apparatus comprises: an acquisition system for acquiring a digital image of the mailpiece, which image includes said information to be recognized; and data-processing means suitable for performing first recognition processing for the purpose of recognizing said information using primary OCR, said apparatus being characterized in that the data-processing means are also suitable for performing the following processing operations:

second recognition processing for recognizing the information using secondary OCR that is improved relative to said primary OCR so as to obtain additional results for recognizing said information;

encoding said additional results and overlaying in said image said results as encoded in a form recognizable by said first recognition processing; and having said first recognition processing extract and use the results encoded in the image for the purpose of recognizing said information.

The apparatus of the invention may have the following features:

said data-processing means are arranged to overlay said results in the form of a bar code in the digital image;

the data-processing means are arranged to overlay the bar code in the image within a rectangular white background.

The invention also provides a postal sorting installation including apparatus as defined above for recognizing delivery addresses on mail.

BRIEF DESCRIPTION OF THE DRAWINGS

The method, the apparatus, and the installation of the invention are described below in more detail with reference to the drawings, in which.

DETAILED DESCRIPTION OF THE PREFERRED EMBODIMENTS

The principle of the invention is thus to insert additional OCR processing (referred to as "secondary" OCR processing below) between an outlet of a digital image acquisition system and pre-existing OCR processing (referred to as "primary" OCR processing below). It is understood that, in the context of the invention, such secondary OCR processing has processing capacities that are additional or improved relative to the processing capacities of the primary OCR processing. The secondary OCR thus, as it were, mitigates the insufficiencies of the primary OCR.

In order not to change the logical and physical interfaces of the image processing system, the digital image is retained in a memory for the time it takes the secondary OCR to perform its recognition of information in the digital image. The results of the secondary OCR processing are overlaid in the digital image, preferably in graphic form that is recognizable and decodable by the primary OCR. When the digital image is processed by the primary OCR, said primary OCR extracts from the digital image the results produced by the secondary OCR processing, thereby contributing to reinforcing the overall recognition capacities of the system.

Application of the principle of the invention to recognizing postal addresses is described below with reference to FIG. 1.

Figure 1:
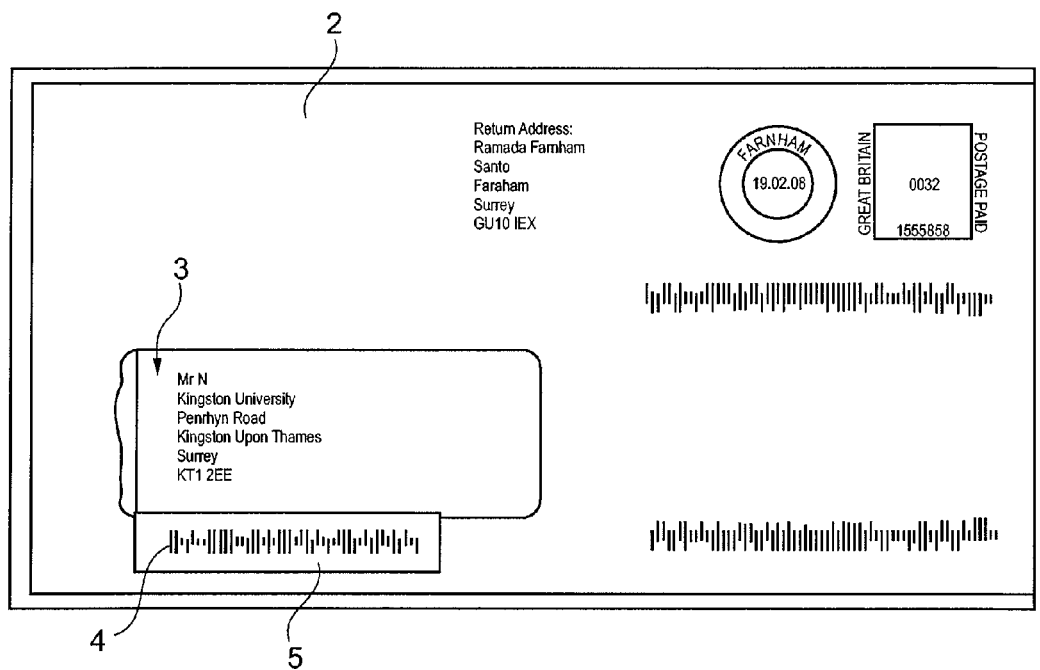
FIG. 1 shows a digital image of a mailpiece in which a bar code is overlaid.

FIG. 1 shows a digital image 2 (a grayscale digital image) of a mailpiece bearing a delivery postal address block 3. Under the address block, a bar code 4 is overlaid within a white rectangular background 5. This bar code 4 encodes the results produced by the secondary OCR processing with a view to them being used by the primary OCR. Instead of using a bar code, the results may be overlaid graphically in the form of a string of characters in a character font that is easily readable by an OCR system. It is also possible to use some other type of graphic code, e.g. a matrix code.

Figure 2:
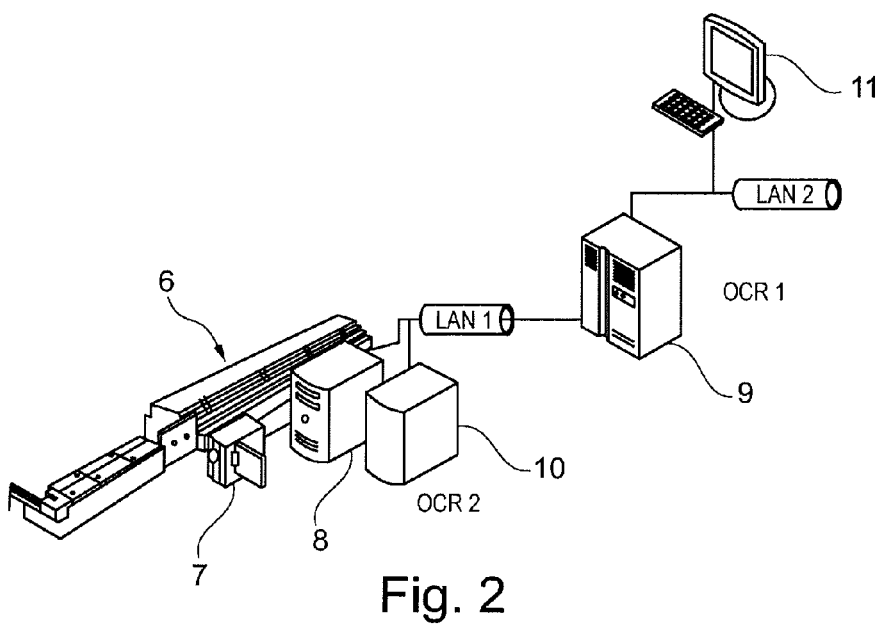
FIG. 2 shows the architecture of a postal sorting installation with primary OCR and secondary OCR of the invention.

FIG. 2 is a highly diagrammatic view of a network architecture for a postal sorting installation of the invention, including a sorting conveyor 6 with sorting outlets, a camera 7 disposed in the path of the mailpieces in the conveyor 6 so as to take a digital image of each mailpiece moving through the conveyor 6, a data storage unit 8 for storing each image produced by the camera 7 and for sending it through a communications network LAN1 towards a recognition system 9 for recognizing address information, in which system the primary OCR processing (OCR 1) is performed on postal address information, it being possible for this OCR processing to use a reference postal-address database that is not shown in FIG. 2.

In this example, the system 9 is also connected via another communications network LAN2 to a remote video-coding system 11 suitable for decoding the postal address with the assistance of an operator, as is well known to the person skilled in the art.

In accordance with the invention, secondary OCR processing of postal addresses, indicated by OCR 2, is interposed between the image acquisition system 7, 8 and the recognition system 9. This other processing may be implemented in a data-processing unit 10 connected to the communications network LAN1.

Figure 3:
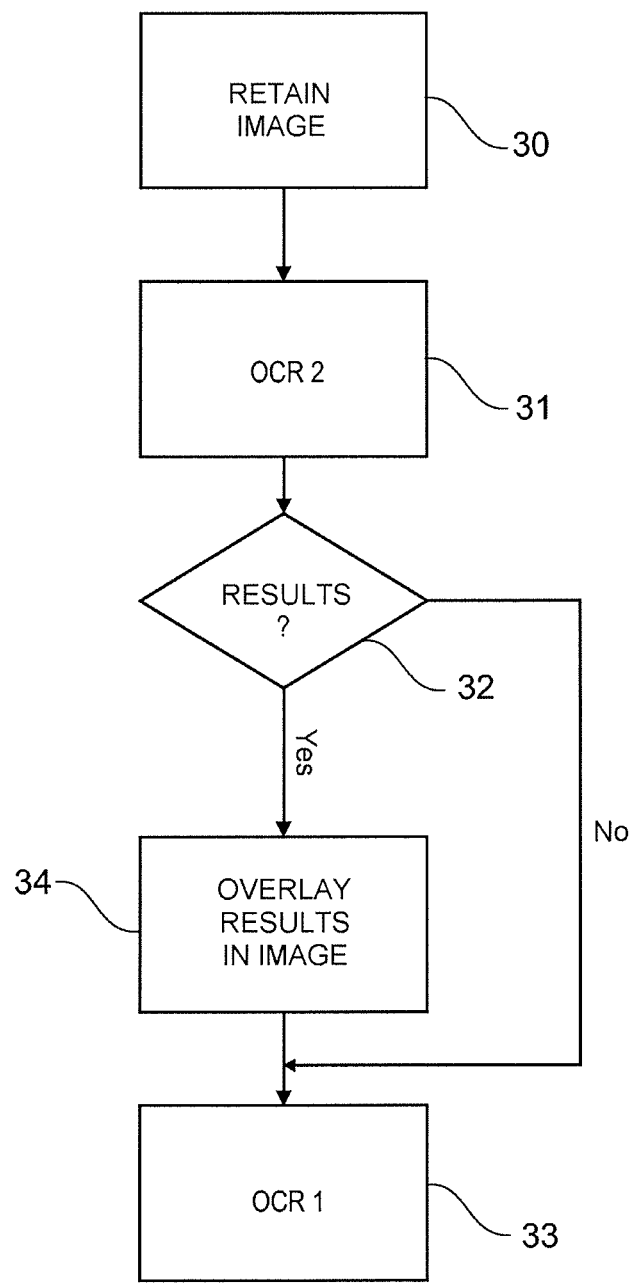
FIG. 3 shows how OCR processing of the invention proceeds.

FIG. 3 shows how the OCR processing of the invention proceeds for a digital image.

In step 30, the unit 8 acquires a digital image of a mailpiece, and retains it in a buffer memory for the time it takes to apply the processing OCR 2 and to overlay in the image the results produced by said processing.

In step 31, the processing OCR 2 is thus applied to said digital image in the memory in the unit 8. This processing OCR 2 may include various recognition stages: locating the recipient address block; extracting the values of the fields of the address block; and unambiguously recognizing the postal address by comparing it with a reference postal-address database. The results of the processing in step 31 can be partial or full. Step 31 can also give no unambiguous result and this is checked in step 32 by the unit 10. When there is no result in step 32, the process continues at 33 by releasing the image in the unit 8 so as to transfer it to the recognition system 9 in which the processing OCR 1 is applied to the image.

If, at 32, it is detected that the processing OCR 2 produces a partial or full result, that result is encoded, e.g. in a bar code that is recognizable using the processing OCR 1, which bar code is overlaid in the image within a white rectangular background as shown in FIG. 1. Then the process continues with the image being transferred to the recognition system 9 and with the processing OCR 1 being applied.

Insofar as the processing OCR 2 succeeds in locating the recipient address block in the image, in step 34 the bar code 4 is overlaid preferably immediately under the recipient address block 3 so as to facilitate retrieval of said bar code by the processing OCR 1, the bar code 4 being easily identifiable by contrasting with the white rectangular background 5.

The process thus continues in step 33 with the processing OCR 1 being applied to the image containing the bar code 4. As indicated above, current OCR processing processes for recognizing postal addresses have functionality features for rapidly identifying a bar code in an image, and for decoding said bar code so as to extract therefrom information for use in a postal address recognition process.

FIG. 2 shows two distinct data-processing units 9 and 10, but naturally the processing OCR 2 may be implemented in the unit 9 without going beyond the ambit of the invention.

It is also possible for the processing OCR 2 to be suitable for recognizing a postage or "franking" face value in the image, which franking value may also be encoded in the bar code 4. It is also possible for the bar code 4 to encode other information that can be recognized by the processing OCR 2 without going beyond the ambit of the invention.

The invention claimed is:

1. A method of recognizing certain information on a mailpiece, said method comprising the steps of:
    taking a digital image of the mailpiece, which image includes said information to be recognized;
    applying second and first recognition processing to said digital image for the purpose of recognizing said information using respectively secondary and primary OCR, said digital image being retained in a memory for the time it takes the secondary OCR to perform its recognition of information of the digital image;
    using a secondary OCR that is improved relative to said primary OCR so as to obtain, with said secondary OCR, additional results for recognizing said information relative to the information obtainable by said primary OCR;
    applying said second recognition processing to said digital image, upstream from said first recognition processing;
    encoding said additional results and inlaying into said digital image said additional results as encoded in a form recognizable by said first recognition processing; and
    applying said first recognition processing to said digital image further containing said additional results, having said first recognition processing extract and use said additional results encoded in the digital image for the purpose of recognizing said information.

2. A method according to claim 1, wherein said additional results are inlaid in the form of a bar code recognizable by said first processing.

3. A method according to claim 2, wherein said information is a delivery postal address of the mailpiece and wherein said bar code is inlaid in the digital image in the vicinity of the address block.

4. A method according to claim 3, wherein said bar code is inlaid in the digital image under the address block.

5. A method according to claim 3, wherein said bar code is inlaid in the digital image within a rectangular white background.

6. Apparatus for recognizing certain information on a mailpiece, the apparatus comprising:
    an acquisition system for acquiring a digital image of the mailpiece, the image including said information to be recognized; and
    data-processing means suitable for performing first recognition processing for the purpose of recognizing said information using primary OCR, wherein the data-processing means are also suitable for performing the following processing operations:
        secondary recognition processing for recognizing the information using secondary OCR that is improved relative to said primary OCR so as to obtain additional results for recognizing said information relative to the information obtainable by said primary OCR; said digital image being retained in a memory for the time it takes the secondary OCR to perform its recognition of information of the digital image:
        applying said second recognition processing to said digital image, upstream from said first recognition processing;
        encoding said additional results and inlaying into said digital image said additional results as encoded in a form recognizable by said first recognition processing; and
        applying said first recognition processing to said digital image further containing said additional results, having said first recognition processing extract and use said additional results encoded in the digital image for the purpose of recognizing said information.

7. Apparatus according to claim 6, wherein said data-processing means are arranged to inlay said additional results in the form of a bar code in the digital image.

8. Apparatus according to claim 7, wherein the data-processing means are arranged to inlay the bar code in the digital image within a rectangular white background.

9. A postal sorting installation including apparatus according to claim 6 for recognizing delivery address information on mail.

* * * * *